Inventor
Albert W. Wahlgren

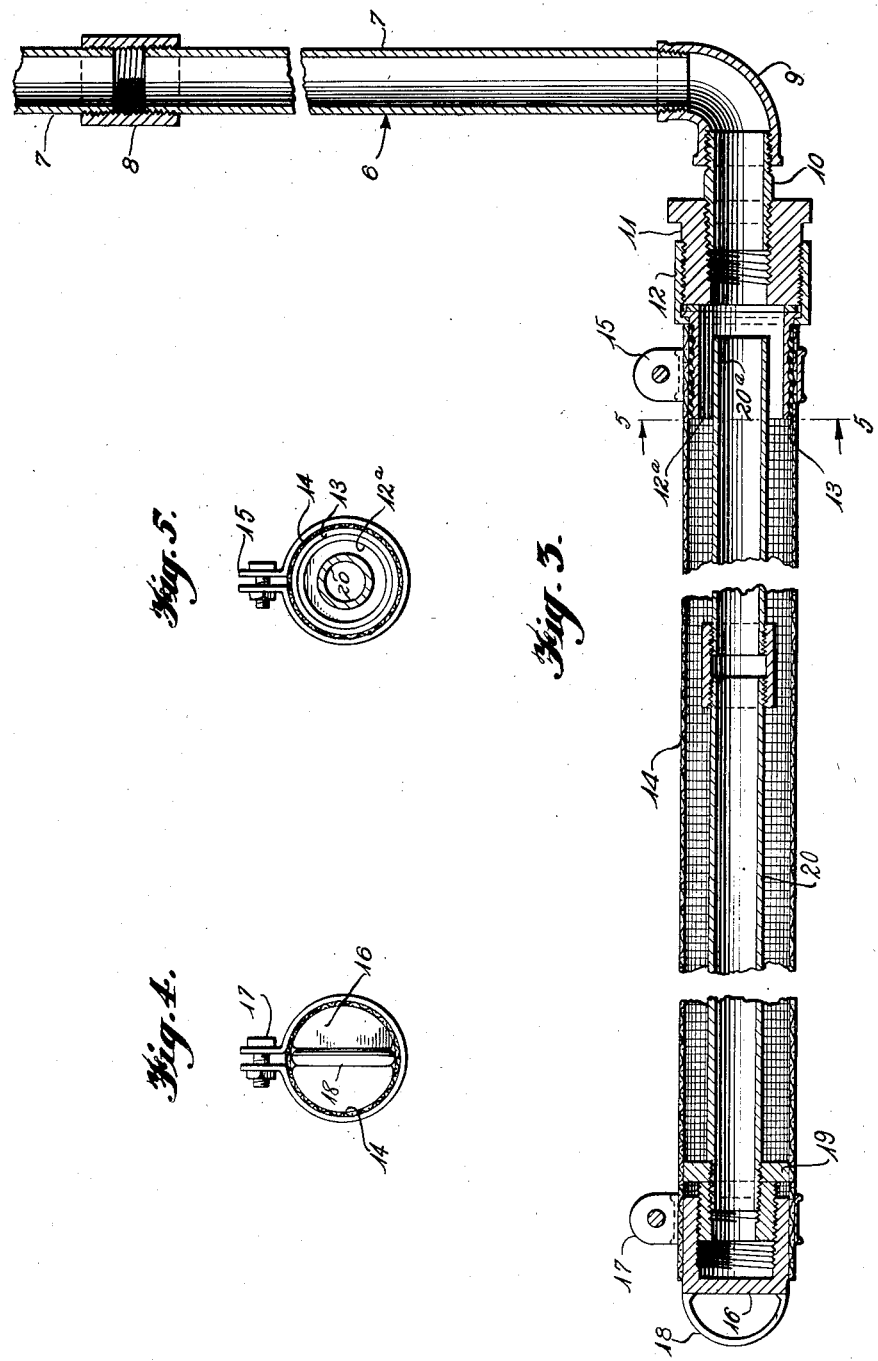

Patented Mar. 28, 1950

2,502,187

UNITED STATES PATENT OFFICE 2,502,187

DIFFUSER APPARATUS FOR TREATING LIQUIDS WITH A GASEOUS MEDIUM

Albert W. Wahlgren, Lansing, Ill., assignor to Cardox Corporation, Chicago, Ill., a corporation of Illinois Application January 9, 1947, Serial No. 721,069

12 Claims. (Cl. 261—122)

This invention relates to new and useful improvements in diffuser apparatus for treating liquids with a gaseous medium and which is particularly well adapted for carbonating water in the carbonation basins or chambers of municipal water treatment plants.

It is the primary object of this invention to provide diffuser apparatus for uniformly and efficiently delivering a gaseous medium in finely divided bubbles to either stationary or flowing liquid in a given area of a treatment basin or chamber in order to obtain the maximum absorption of the gaseous medium by the liquid.

A further important object of the invention is the provision of diffuser apparatus of the above mentioned type which is readily assembled or disassembled to facilitate storage and shipment and which is easily positioned in and removed from liquid treatment basins or chambers, without the necessity of workmen draining the liquid out of and/or entering the basins or chambers, regardless of whether the said basins or chambers are completely open at their top or are closed with the exception of a suitable number of properly spaced manholes.

Another object of the invention is to provide a diffuser especially adapted for effecting carbonation of water in municipal water treatment plants which is designed for delivering 100% carbon dioxide vapor to the water for proper absorption thereby; which can be cleaned readily to remove lime encrustations, carbonate deposits, or the like, without requiring the surfaces of diffuser pipes to be cleaned and holes formed therein to be reamed out; and which is made up of interchangeable parts that are sectionalized where necessary to permit diffusers of different sizes or capacities to be assembled readily.

Figure 1:
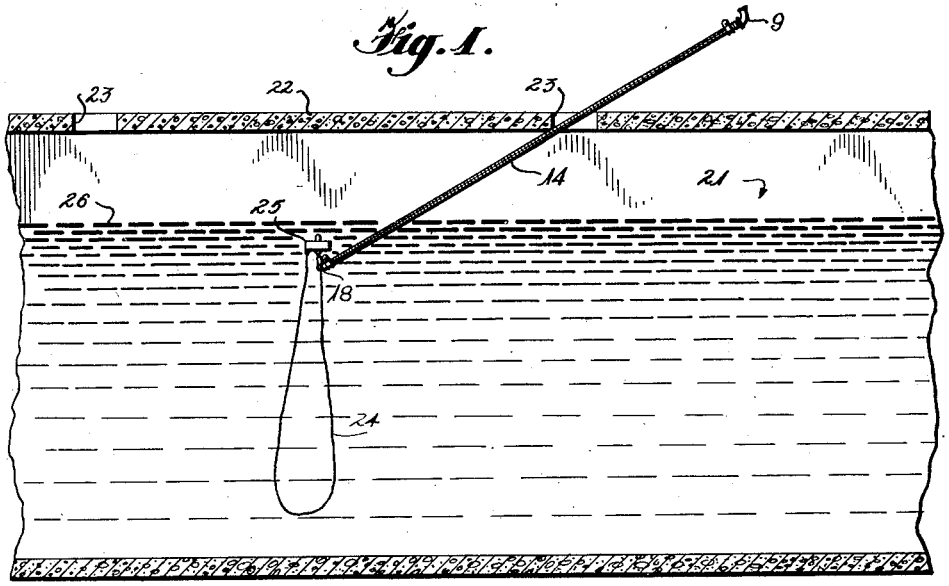
Figure 2:
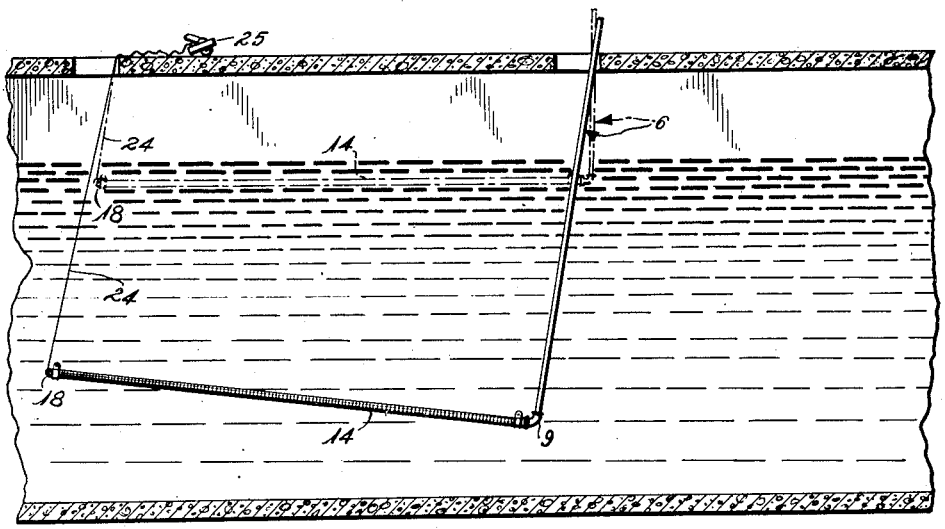

Other objects and advantages of the invention will be apparent during the course of the following description:

In the accompanying drawings forming a part of this specification and in which like numerals are employed to designate like parts throughout the same, Figure 1 is a vertical sectional view of a liquid treatment basin or chamber with a diffuser embodying this invention illustrated as being inserted therein through an open manhole, Figure 2 is a similar view to Fig. 1 but illustrates the diffuser properly positioned therein, Figure 3 is a vertical sectional view illustrating the arrangement of the component parts of a diffuser embodying the invention, and, for greater clarity, showing the counterpoise and stiffening piping positioned along the axis of the diffuser, Figure 4 is a detail, outer end elevational view of the diffuser of Fig. 3, and Figure 5 is a transverse sectional view taken on line 5—5 of Fig. 3.

In the drawings, wherein for the purpose of illustration is shown the preferred embodiment of this invention, and first particularly referring to Figs. 3 to 5 inclusive, the reference character 6 designates a supply or feed pipe-line that extends from a suitable source of supply of a gaseous medium, such as carbon dioxide in vapor form, said supply not being disclosed in the drawings. This supply or feed pipe 6 should be made up of a suitable number of sections 7 that are coupled together at 8 to provide a length of piping that bears the desired relationship to the depth of the liquid treatment chamber or basin in which the diffuser is to be employed.

The lower end of the supply or feed pipe 6 is connected by a suitable elbow 9 to a short nipple 10. The free end of the nipple is threaded in the bore of a bushing 11 that is externally screw-threaded to have detachably connected thereto a hose coupling, or the like, 12. The reduced end portion 12a of the hose coupling 12 has a thin rubber sleeve 13 fitted thereover.

One end of a flexible, porous tube 14 is fitted over the rubber sleeve 13 and is secured in position by a hose clamp, or the like, 15. Although the tube 14 may be formed in several different ways and from different types of materials, it is preferred that the tube be made from tightly woven cotton fabric that is treated with one or more coats of Ceraseal to waterproof the fabric and protect it against mildew and deterioration from other causes. The coating of the fabric also prevents its fibers from swelling. If the fibers were permitted to swell, the diffuser tube would not retain the desired, uniform porosity that is necessary to obtain a uniform discharge of the gaseous medium, such as vaporous carbon dioxide, as finely divided bubbles.

It is preferred that the flexible, porous tube 14 be about twenty feet in length. Its outer end is fitted over a cap 16 and is suitably secured thereto by means of a hose clamp, or the like, 17. This cap 16 has formed thereon the loop 18, the function of which will be explained at a later point.

Threaded in the bore of the cap 16 is a bushing 19. This bushing is employed for connecting to the cap one end of the length of piping 20. This piping preferably is formed of two or more sections that are properly coupled together at their adjacent ends. The overall length of the piping should be such as to cause its free extremity 20a to terminate loosely in, or in a floating relationship to, the bore of the extension 12a which forms a part of the hose coupling 12. The length of piping 20 is intended to serve as a counterpoise against the buoyancy of the inflated tube 14 and gives rigidity and straightness to the assembled diffuser head.

It will be appreciated that when the diffuser head is in operation within a fluid treatment basin or chamber 21, the extremity 20a of the piping 20 may occupy different positions within the bore of the extension 12a. When the cap 16 is in alinement with or at a greater elevation than the extension 12a, the inner bottom edge of the extremity 20a will contact the bore of the extension at a point intermediate the ends of the latter. On the other hand, when the cap 16 is at a lesser elevation than the extension 12a, an intermediate portion of the bottom of the extremity 20a will contact the outer edge of the bore of the extension. For these reasons, and for greater clarity, the piping 20 is illustrated in what may be termed a neutral position in Figs. 3 and 5.

Because the free extremity 20a of the length of tubing 20 is positioned within the bore of the extension 12a so as to partake of both lateral and longitudinal movements, or so as to freely float therein, the piping 20 is permitted to pivot or swing to a limited extent relative to the assembly that is carried by the lower end of the supply or feed pipe 6. The length of piping 20, also, is permitted to move longitudinally relative to the hose coupling extension 12a to allow for a limited amount of expansion and contraction of the porous tube 14 as a result of inflating and deflating the latter. As a result of the permissible movements of the length of piping 20 relative to the lower end assembly carried by the supply pipe 6, the porous tube 14 can be flexed, expanded and contracted so as to dislodge any deposit or encrustation that may form on the exterior surface thereof. It will be appreciated that this freeing of the tube of any accummulation of foreign matter on its exterior may be accomplished while the diffuser head is fully assembled and is arranged in operative position within a fluid treatment basin or chamber.

Figs. 1 and 2 of the drawings illustrate how the diffuser assembly can be inserted and removed from a fluid treatment basin or chamber 21 that is provided with a cover or top 22 formed with suitably spaced manholes 23. Fig. 1 discloses the diffuser head being inserted in the basin or chamber 21 through one of the manholes 23. This figure also illustrates the loop 18, that is formed on the cap 16 at the outer end of the diffuser head as functioning to permit one end of a suitable length of cable, chain, or the like, 24 to be attached thereto. The remaining end of this cable 24 is connected to a float 25 that is shown as being suitably, detachably connected to the said loop 18. Any suitable means, such as a snap-hook or even a length of cord or wire may be employed for detachably fastening the float 25 to the loop 18.

The float 25, when closely connected to the outer end of the diffuser head, will function to support the diffuser close to the surface of the body of liquid 26 within the treatment basin or chamber 21. By properly directing the diffuser head as it is inserted in the basin or chamber through one manhole 23, the float supported extremity of the diffuser head will be located beneath another manhole 23 after the diffuser head has been completely inserted in the basin or chamber 21. An attendant, located at this second manhole 23, can readily detach the float 25 from the extremity of the diffuser head and then employ the cable, chain, or the like 24 for supporting the extremity of the diffuser head while the said head is being lowered into the body of liquid 26 located in the basin or chamber 21.

Fig. 2 illustrates the diffuser head in two positions. The upper position is assumed when the attendants are ready to lower the head into the body of liquid. The lower position illustrates the diffuser head properly arranged for its intended operation for releasing the gaseous medium into the body of liquid. It is noted that the outer extremity of the diffuser head is arranged at a higher level than the inner end which is attached to the supply or feed pipe 6. This inclined positioning of the diffuser head is very desirable in effecting a uniform discharge of the gaseous medium into the liquid throughout the entire length of the head. In other words, the pressure of the gaseous medium will be less at the outer extremity of the diffuser head than at the inner end thereof and by supporting the diffuser head at an angle or at an inclination relative to the surface of the body of liquid 26, the external pressure applied to the head by the body of liquid will be varied in proportion to the drop in pressure of the vaporous medium at different points throughout the length of the diffuser head.

By reversing the above described procedure, the diffuser assembly very readily can be withdrawn from the basin or chamber for repairs, or the like.

From the detailed description given of the diffuser head, as illustrated in Figs. 3 to 5 inclusive, it will be appreciated that the diffuser assembly may be taken apart very readily to facilitate storage or shipment. It, also, will be apparent that damaged or wornout portions of a diffuser head assembly may be replaced at a very low cost.

It is to be understood that the form of this invention herewith shown and described is to be taken as a preferred example of the same, and that various changes in the shape, size, and the arrangement of parts may be resorted to without departing from the spirit of the invention or the scope of the subjoined claims.

Having thus described the invention, I claim:

1. Diffuser apparatus for treating liquids with a gaseous medium, comprising a supply pipe for the gaseous medium, a porous flexible tube, means for connecting one end of the tube to said supply pipe so that the gaseous medium will be directly delivered to the tube to inflate the same and for release as finely divided bubbles through its pores a cap attached to the outer end of the tube to close the latter, and an elongated weight member attached to the cap and extending through the bore of the tube and loosely positioned within the means connecting the tube to the supply pipe, said weight member acting as a counterpoise against the buoyancy of the inflated tube and for holding the tube substantially stiff and straight.

2. Diffuser apparatus for treating liquid with a gaseous medium, comprising a supply pipe for the gaseous medium, a two-part coupling having one part connected to the supply pipe, a porous, flexible, fabric tube, means for connecting one end of the tube to the other part of the coupling so that the gaseous medium will be directly delivered to the tube to inflate the same and for release through its pores as finely divided bubbles, a cap attached to the outer end of the tube to close the latter, and an elongated weight member for counterpoising the buoyancy of the inflated tube and for holding it substantially stiff and straight, said member attached to the cap and extending through the bore of the tube and loosely positioned within the means connecting the flexible tube to the supply pipe.

3. Diffuser apparatus for treating liquids with a gaseous medium, comprising a supply pipe for the gaseous medium, a porous, flexible tube, means for connecting one end of the tube to said supply pipe so that the gaseous medium will be directly delivered to the tube to inflate the same and for release as finely divided bubbles through its pores, a cap attached to the outer end of the tube to close the latter, means attached to the cap for supporting the outer end of the flexible tube at the desired levels in the body of liquid being treated, and a member for counterpoising the buoyancy of the inflated tube and for holding it substantially stiff and straight, said member attached to the cap and extending through the bore of the tube and loosely positioned within the means connecting the tube to the supply pipe.

4. Diffuser apparatus for treating liquids with a gaseous medium, comprising a supply pipe for the gaseous medium, two-part coupling means having one part connected to the supply pipe, a porous, flexible, fabric tube, means for connecting one end of the tube to the other part of the coupling means so that the gaseous medium will be directly delivered to the tube to inflate the same and for release through its pores as finely divided bubbles, a cap attached to the outer end of the tube to close the latter, means attached to the cap for supporting the outer end of the tube at desired levels in the body of liquid being treated, and a member for counterpoising the buoyancy of the inflated tube and for holding it substantially stiff and straight, said member attached to the cap and extending through the bore of the tube and loosely positioned within the means connecting the tube to the supply pipe.

5. Diffuser apparatus for treating liquids with a gaseous medium, comprising a supply pipe for the gaseous medium, a porous, flexible tube, means for connecting one end of the tube to said supply pipe so that the gaseous medium will be directly delivered to the tube to inflate the same and for release as finely divided bubbles through its pores, a cap attached to the outer end of the tube to close the latter, and a series of coupled pipe sections for counterpoising the buoyancy of the inflated tube and for holding it substantially stiff and straight attached to the cap and extending through the bore of the tube to be loosely positioned within the means connecting the tube to the pipe.

6. Diffuser apparatus for treating liquids with a gaseous medium, comprising a supply pipe for the gaseous medium, two-part coupling means having one part connected to the supply pipe, a porous, flexible, fabric tube, means for connecting one end of the tube to the other part of the coupling means so that the gaseous medium will be directly delivered to the tube to inflate the same and for release through its pores as finely divided bubbles, a cap attached to the outer end of the tube to close the latter, and a series of coupled pipe sections for counterpoising the buoyancy of the inflated tube and for holding it substantially stiff and straight attached to the cap and extending through the bore of the tube to be loosely positioned within the two-part coupling means.

7. Diffuser apparatus for treating liquids with a gaseous medium, comprising a supply pipe for the gaseous medium, a porous, flexible tube, means for connecting one end of the tube to said supply pipe so that the gaseous medium will be directly delivered to the tube to inflate the same and for release as finely divided bubbles through its pores, a cap attached to the outer end of the tube to close the latter, means attached to the cap for supporting the outer end of the flexible tube at desired levels in the body of liquid being treated, and a series of coupled pipe sections for counterpoising the buoyancy of the inflated tube and for holding it substantially stiff and straight attached to the cap and extending through the bore of the tube to be loosely positioned within the two-part coupling.

8. Diffuser apparatus for treating liquids with a gaseous medium, comprising a supply pipe for the gaseous medium, two-part coupling means having one part connected to the supply pipe, a porous, flexible, fabric tube, means for connecting one end of the tube to the other part of the coupling means so that the gaseous medium will be directly delivered to the tube to inflate the same and for release through its pores as finely divided bubbles, a cap attached to the outer end of the tube to close the latter, means attached adjustably to the cap for supporting the outer end of the flexible tube at desired levels in the body of liquid being treated and a series of coupled pipe sections for counterpoising the buoyancy of the inflated tube and for holding it substantially stiff and straight attached to the cap and extending through the bore of the tube to be loosely positioned within the coupling means.

9. Diffuser apparatus for treating liquids with a gaseous medium, comprising a supply pipe for the gaseous medium, a porous, flexible tube, means for connecting one end of the tube to said supply pipe so that the gaseous medium will be directly delivered to the tube to inflate the latter and for release as finely divided bubbles through its pores, a cap attached to the outer end of the tube to close the latter, and a stiffener member for the flexible tube attached to the cap and extending through the bore of the tube to be loosely positioned within the means connecting the tube to the supply pipe, said stiffener member having sufficient weight to act as a counterpoise against the buoyancy of the tube when the tube is inflated and submerged in a body of liquid to be treated.

10. Diffuser apparatus for treating liquid with a gaseous medium, comprising a supply pipe for the gaseous medium, a two-part coupling having one part connected to the supply pipe, a porous, flexible fabric tube, means for connecting one end of the tube to the other part of the coupling so that the gaseous medium will be directly delivered to the tube to inflate the latter and for release through its pores as finely divided bubbles, a cap attached to the outer end of the tube to close the latter, and a stiffener member for the flexible tube attached to the cap and extending through the bore of the tube to be loosely positioned within the two-part coupling, said stiffener member having sufficient weight to act as a counterpoise against the buoyancy of the tube when the tube is inflated and submerged in a body of liquid to be treated.

11. Diffuser apparatus for treating liquids with a gaseous medium, comprising a porous, flexible tube, a coupling member attached to one end of said tube for connecting said tube to a gas supply pipe, means for closing the opposite end of said tube, and an elongated rigid stiffener member for the flexible tube attached at one end portion to said closing means and extending through the bore of the tube and loosely positioned within the coupling member at its other end.

12. Diffuser apparatus for treating liquids with a gaseous medium, comprising a supply pipe for the gaseous medium, a porous, flexible tube, tubular coupling means for detachably connecting one end of said tube to the supply pipe so that the gaseous medium will be directly delivered to the tube to inflate the latter and for release through its pores as finely divided bubbles, means for closing the opposite end of the flexible tube, and an elongated stiffener member for the flexible tube attached at one end portion to said closing means and extending through the tube into said coupling means, said stiffener member having an outside diameter that is substantially less than the inside diameter of the flexible tube and coupling means to permit the stiffener member to be loosely positioned therein to provide a flow path for the gaseous medium around the stiffener member, said stiffener member having sufficient weight to act as a counterpoise against the buoyancy of the tube when the latter is inflated and submerged in a body of liquid to be treated.

ALBERT W. WAHLGREN.

REFERENCES CITED

The following references are of record in the file of this patent:

UNITED STATES PATENTS

| Number | Name | Date |
|---|---|---|
| 894,168 | Smith | July 21, 1908 |
| 1,124,855 | Callow et al. | Jan. 12, 1915 |
| 1,305,943 | Smith | June 3, 1919 |
| 1,314,316 | Flinn | Aug. 26, 1919 |
| 2,065,480 | Braem | Dec. 8, 1936 |
| 2,241,337 | Work | May 6, 1941 |
| 2,382,393 | Bille | Aug. 14, 1945 |

FOREIGN PATENTS

| Number | Country | Date |
|---|---|---|
| 431,674 | Great Britain | July 12, 1935 |